United States Patent
Mustalahti et al.

(10) Patent No.: US 7,344,015 B2
(45) Date of Patent: Mar. 18, 2008

(54) CONVEYOR

(75) Inventors: Jorma Mustalahti, Hyvinkää (FI); Esko Aulanko, Hyvinkää (FI)

(73) Assignee: KONE Corporation, Helsinki (FI)

( * ) Notice: Subject to any disclaimer, the term of this patent is extended or adjusted under 35 U.S.C. 154(b) by 0 days.

(21) Appl. No.: 11/416,175

(22) Filed: May 3, 2006

(65) Prior Publication Data
US 2006/0266617 A1  Nov. 30, 2006

Related U.S. Application Data

(63) Continuation of application No. PCT/FI2004/000621, filed on Oct. 20, 2004.

(30) Foreign Application Priority Data
Nov. 3, 2003  (FI) ................................. 20031590

(51) Int. Cl.
*B65G 17/48*  (2006.01)
(52) U.S. Cl. .................... 198/321; 198/475.1; 198/800
(58) Field of Classification Search ................ 198/321, 198/475.1, 797–800
See application file for complete search history.

(56) References Cited
U.S. PATENT DOCUMENTS 2,195,326 A * 3/1940 Crawford et al. ........... 198/798
2,369,840 A * 2/1945 Nalbach et al. ............. 198/799
2,414,164 A * 1/1947 Nalbach ...................... 198/798
2,493,857 A * 1/1950 Cargill ........................ 198/798
2,512,356 A   6/1950 Massiello
2,893,538 A * 7/1959 Buttironi et al. ............ 198/795
3,243,032 A * 3/1966 Chambon ................. 198/456.3
5,060,779 A * 10/1991 Landaeus ..................... 198/321

FOREIGN PATENT DOCUMENTS

| DE | 1805212 A | 12/1969 |
| EP | 0 083 500 | 7/1983 |
| EP | 1 258 447 A1 | 11/2002 |
| GB | 2 299 316 | 10/1996 |
| JP | 2000-7263 A | 1/2000 |

* cited by examiner

*Primary Examiner*—Mark A. Deuble
(74) *Attorney, Agent, or Firm*—VENABLE LLP; Robert Kinberg; Ryan M. Flandro

(57) ABSTRACT

The present invention relates to a method of changing the direction of motion of a pallet at an end of a transport conveyor while maintaining the pallet at a substantially constant attitude. The method comprises conveying pallets in a passenger transport direction and at a first level, conveying pallets in a return direction and at a second, different level, positively guiding a trailing end of a first pallet with respect to its direction of motion with a supporting element, and rotating the supporting element with a second pallet located immediately behind the first pallet with respect to the direction of motion, thereby moving the trailing end of the first pallet from one of the first level and the second level to the other of the first level and the second level and changing the direction of motion of the first pallet.

12 Claims, 3 Drawing Sheets

CONVEYOR

CROSS-REFERENCE TO RELATED APPLICATIONS

This application is a continuation of the U.S. National Phase Designation of International Application No. PCT/FI2004/000621, filed on Oct. 20, 2004, which claims priority of Finnish Application No. FI20031590, filed on Nov. 3, 2003. The entire content of the aforementioned applications is expressly incorporated herein by reference thereto.

BACKGROUND OF THE INVENTION

The present invention relates to a method and apparatus for changing the direction of motion of a pallet moving on wheels at the end of a transport conveyor or the like.

Like escalators, transport conveyors are transport devices designed to move people or goods. They differ from escalators, e.g., in that they are often operated in a substantially horizontal position or in a position somewhat inclined relative to their direction of motion, typically by 1-15°, so that successive steps, i.e., pallets form a substantially even and linear track instead of stair-like steps as in the case of escalators. Instead of successive steps, transport conveyors may also have a continuous belt, in which case the transport conveyor resembles a belt conveyor. Transport conveyors are also called moving walkways and autowalks.

In prior-art transport conveyors, the structure is typically embedded in the ground or in the floor of the building. In this case, a pit about one meter deep and several meters long is provided at either end of the transport conveyor for the drive machinery of the transport conveyor structure and for the mechanism turning the pallets. Correspondingly, the depth of the recess needed in the middle part of the transport conveyor is about half a meter. One drawback with these types of transport conveyor constructions is that they require heavy and fixed structures in the floor of the surrounding area, which must be taken into account at the time of designing the buildings. Another drawback is that transferring fixed structures like these from one place to another (e.g., in response to changing traffic needs) is completely impossible.

In prior-art solutions, the pallet track typically consists of pallets that are about 15-40 cm long, corresponding to the steps of escalators. The pallets are usually chained together by means of a chain, e.g., a cogged belt, and the whole chain is driven by a machine having a sprocket. The upper pallets in the chain move on rollers supported by a special track. At the end of the pallet track, the pallets turn upside down around a wheel of a large diameter and return back to the beginning of the track by the lower side of the track. At the beginning of the track, the pallets again turn around to their normal traveling position and move further on the upper side of the track towards the end of the track.

One of the problems with this type of prior art solution is the turning-over motion of the pallets at the ends of the track, because the height of the turning space has to be at least equal to the length of the pallet. In practice, however, the height is typically about 1.5-2 times the length of the pallet in order to provide adequately smooth operation.

In British Patent Document No. GB2299316, FIG. 1/3 shows a structure of the above-described type as an example of the prior art. In addition, this document discloses a transport conveyor construction wherein the pallets are guided by fixed tracks at their turning points while being continuously held in a horizontal position. Thus, the pallet is not turned upside down at the turning point. Control of the pallets is maintained by means of a curved track for the leading wheels (in the direction of motion of the pallet) while the trailing wheels are substantially free. However, this solution involves the problem that the track has so-called dead centers at its end points where the position of the pallet is not precisely controlled. As a consequence, the pallet may get jammed at the dead center, which can cause the entire apparatus to stop as a result of the operation disturbance, and may even be damaged. The risk of jamming is increased by the running clearances, non-ideal track properties, and wear of the mechanism.

SUMMARY OF THE INVENTION

It is an object of the present invention to overcome the above-mentioned drawbacks of the prior art, and to create a method and an apparatus for changing the direction of motion at the end of a transport conveyor or equivalent that is simple in mechanical construction and reliable in operation. A further object of the present invention is to create a transport conveyor structure having a low overall height, and that can be mounted directly on a base, e.g., on a floor.

According to one exemplary embodiment, the present invention relates to a method of changing the direction of motion of a pallet at an end of a transport conveyor while maintaining the pallet at a substantially constant attitude, comprising: conveying pallets in a passenger transport direction and at a first level; conveying pallets in a return direction and at a second, different level; positively guiding a trailing end of a first pallet with respect to its direction of motion with a supporting element; and rotating the supporting element with a second pallet located immediately behind the first pallet with respect to the direction of motion; thereby moving the trailing end of the first pallet from one of the first level and the second level to the other of the first level and the second level and changing the direction of motion of the first pallet.

According to another exemplary embodiment, the present invention relates to an apparatus for changing the direction of motion of a pallet at the end of a transport conveyor while maintaining the pallet at a substantially constant attitude, comprising: a first track adapted to transport pallets moving on wheels in a passenger transport direction and at a first level; a second track adapted to transport pallets moving on wheels in a return direction and at a second, different level; a power transmission element adapted to move the pallets along the first and second tracks; and a supporting element adapted to positively guide a trailing end of a first pallet with respect to its direction of motion from one of the first level and the second level to the other of the first level and the second level, the supporting element adapted to be rotated by a second pallet located immediately behind the first pallet with respect to the direction of motion.

One advantage of the present invention is that the low overall height of the transport conveyor structure allows it to be mounted directly on the floor. According to an exemplary embodiment, the lowest overall height is only slightly greater than the height of two pallets (because the returning pallets need a space to move under the pallets located above). The floor may be, e.g., an asphalt or concrete surface either outside or inside a building. According to an exemplary embodiment, the structure does not require any pit or corresponding space specifically made for it, resulting in cost advantages and also providing flexibility in the location of the transport conveyor. In addition, if necessary, the transport conveyor structure can be relocated to a new location with minor variations and at a low cost. A further advantage is that the present invention makes it possible to achieve a light construction such that the floor under the transport conveyor forms the final reinforcement of the structure.

Yet another advantage is the elimination of the turning-movement of the pallets, thereby reducing/eliminating jamming of the structure and the attendant operation disturbances, and also increasing the reliability of the structure. An additional advantage is that, during the direction-changing phase, the pallet is moved from one level to the other by the trailing wheels (relative to the direction of motion), i.e., alternately by the "front wheels" and by the "rear wheels". This together with the fact that both the pallet and the track have a mirror image-like structure in the longitudinal direction of the track makes it possible to achieve a simple construction that allows the pallets to be driven equally well in both clockwise and counter-clockwise directions. Moving the pallets by the wheels also provides the advantage that, during the direction-changing phase, the paths of motion of the pallet are accurate and the operation is quiet due to a continuous hold. In addition, no extra clatter occurs during the direction-changing phase, because an idler moving the pallets has a soft surface layer in contact with the pallet wheels.

BRIEF DESCRIPTION OF THE DRAWINGS

The present invention will now be described in detail with reference to an exemplary embodiment, referring to the attached drawings, wherein.

DETAILED DESCRIPTION OF THE PREFERRED EMBODIMENTS

Figure 1:
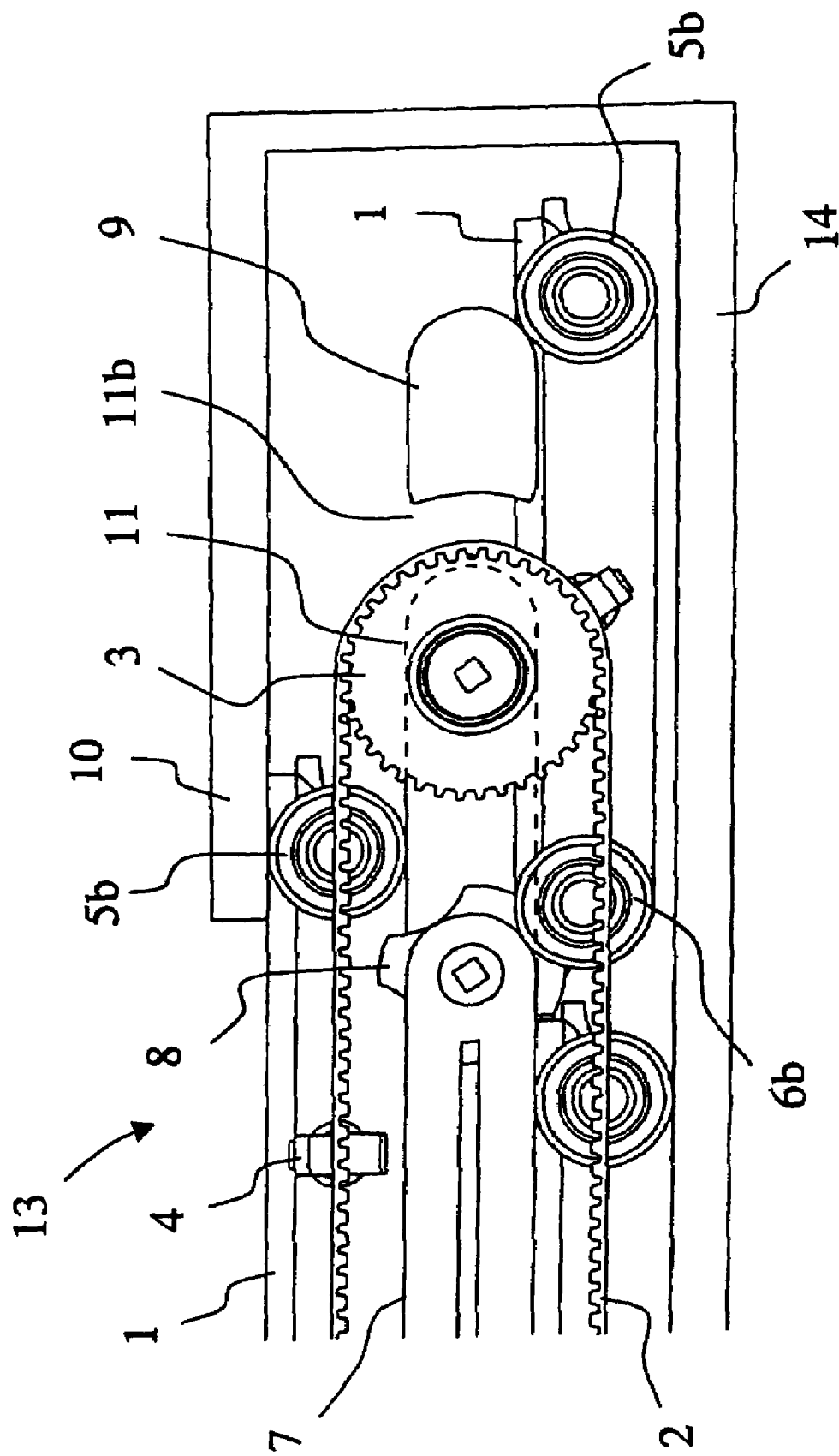
FIG. 1 is a side view of the exit end of an exemplary embodiment of the transport conveyor structure of the present invention.

Referring to FIGS. 1-4, the transport conveyor structure 13 of the present invention comprises a frame structure 14, whose function is to hold the equipment together and transmit the forces to the floor under it. Located inside the frame structure is a pallet track (comprising multiple pallets 1), on the upper surface of which the passengers stand. In addition, the transport conveyor structure comprises a pallet track drive mechanism including a drive sprocket 3 and a cogged belt 2. The transport conveyor structure can also comprise handrails and their drive mechanism.

Figure 4:
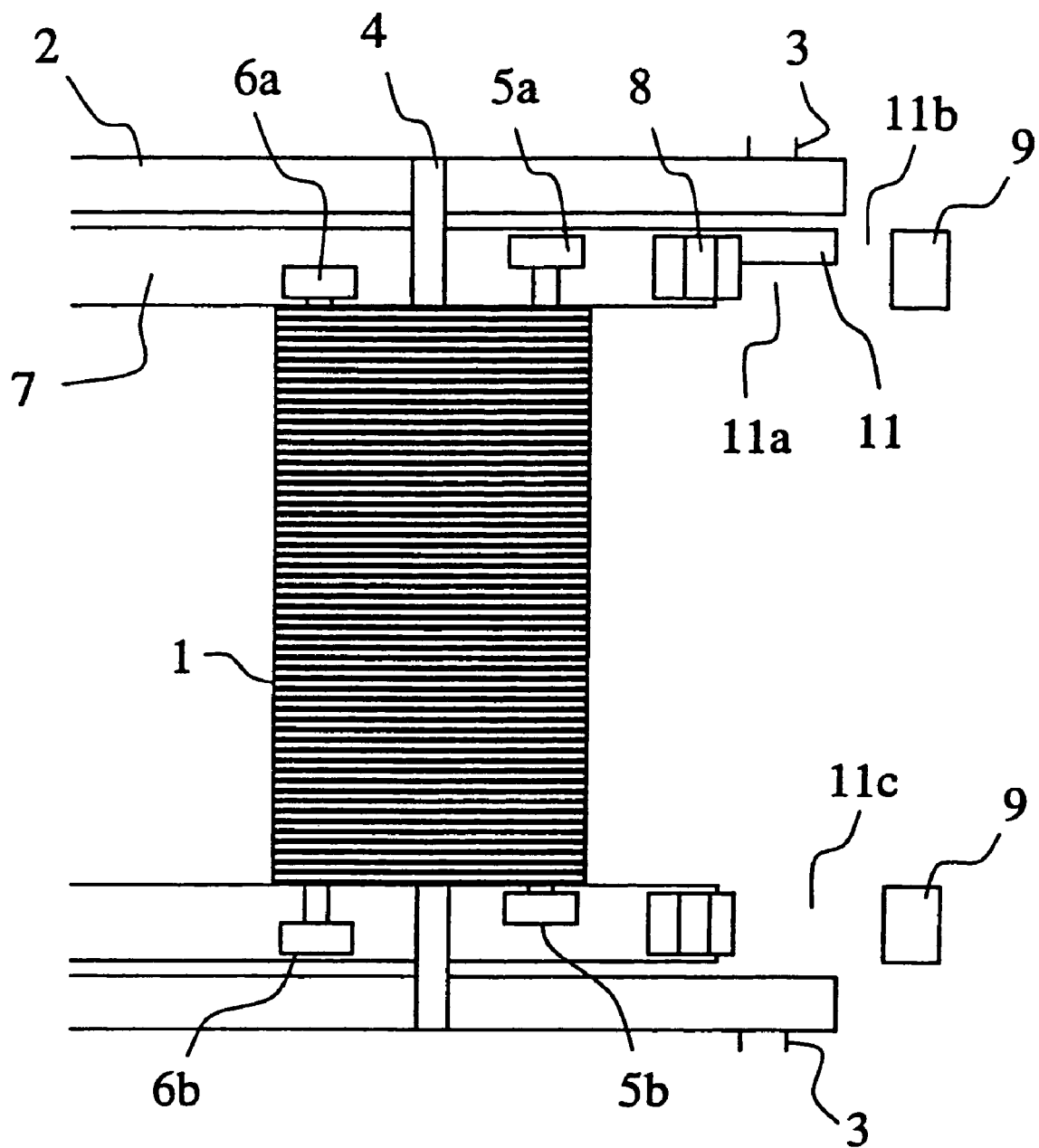
FIG. 4 is a top view of the exit end of the transport conveyor structure of the invention.

The pallet track comprises separate pallets 1 having wheels, with front wheels 5a and 5b located at the front corners of the pallet relative to the normal direction of transport, and rear wheels 6a and 6b located at the rear corners of the pallet. Referring to FIG. 4, front wheel 5a is located at a front corner at a position removed outward by a predetermined distance relative to the corresponding rear wheel 6a on the same side of the pallet. Similarly, the rear wheel 6b on the other side of the pallet is located at a rear corner at a position removed outward by a substantially equivalent predetermined distance relative to the corresponding front wheel 5b on the same side of the pallet. The predetermined distance is configured such that it allows rear wheel 6a to fall onto the return track and likewise front wheel 5b to rise onto the upper track 7 at the other end of the transport conveyor. Before descending onto the lower, return track, the pallet 1 is supported through some distance by at least three wheels 5a, 6a and 6b.

Each side edge of the pallets 1 includes a fastening element 4 placed at about the middle part of the pallet relative to its direction of motion. The fastening elements 4 fasten the pallet by its side edge to the cogged belt 2. The pallet 1 is fastened to the cogged belt 2 in such a way that the fastening element 4 allows the pallet to remain oriented in substantially the same direction throughout the direction-changing phase, i.e., with the grooved supporting surface facing substantially upwards.

The pallets 1 moving in the passenger-carrying direction are driven by the cogged belt 2 and supported by their wheels 5 and 6, and move along the upper tracks 7. The pallets 1 moving in the return direction, supported by the same wheels, move along a return track (e.g., a race) in the lower part of the frame structure 14. At the end of the transport conveyor, the forward edge of the pallet goes under a so-called foot board 10, which is usually a comb blade. At about the same point, the normal track 7 narrows on one side of the transport conveyor into a track extension 11, shown in FIG. 4, so that when the rear wheel 6a reaches that point, the normal track 7 provides no support for it. Therefore, in the region of the extension 11, the rear wheel 6a can freely move through a passage opening 11a onto the return track. The track extension 11 extends as a narrower track and is located along the line of motion of the outer wheel 5a at the front edge of the pallet, at substantially the same level as the track 7. Thus, the outer front wheel 5a is supported on the extension 11 to prevent tilting of the front end of the pallet at the beginning of the direction-changing phase. The distance of the rear wheel 6a on the corresponding side of the pallet from the side edge of the pallet is smaller than the distance of the front wheel 5a by an amount such that the rear wheel 6a does not extend onto the track extension 11, as can be seen in FIG. 4. Consequently, the extension 11 does not prevent the rear part of the pallet from descending through the passage opening 11a to the level of the lower track in the frame structure 14 during the direction-changing phase.

The transport conveyor may have a corresponding track structure at the entry end of the pallet track, in which case the structure is a longitudinal mirror image of the exit-end structure described above. At the entry end, rear wheel 6b can be supported on a corresponding track extension and front wheel 5b can rise to its upper position by the front end of the beginning of the track, where a suitable opening is provided for the front wheel 5b located closer to the inner edge of the pallet. As the entry end structure is substantially identical to the structure of the exit end, the entry end is not shown separately in the drawings.

Figure 2:
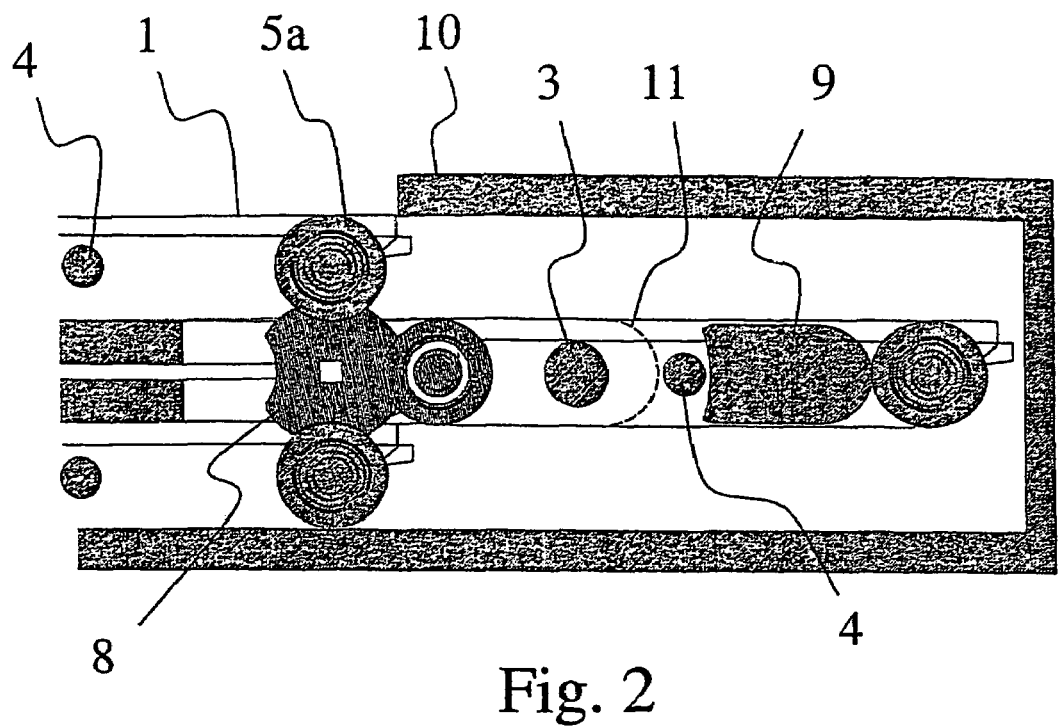
FIG. 2 is a sectional side view of the exit end of the transport conveyor structure of the present invention at one stage.
Figure 3:
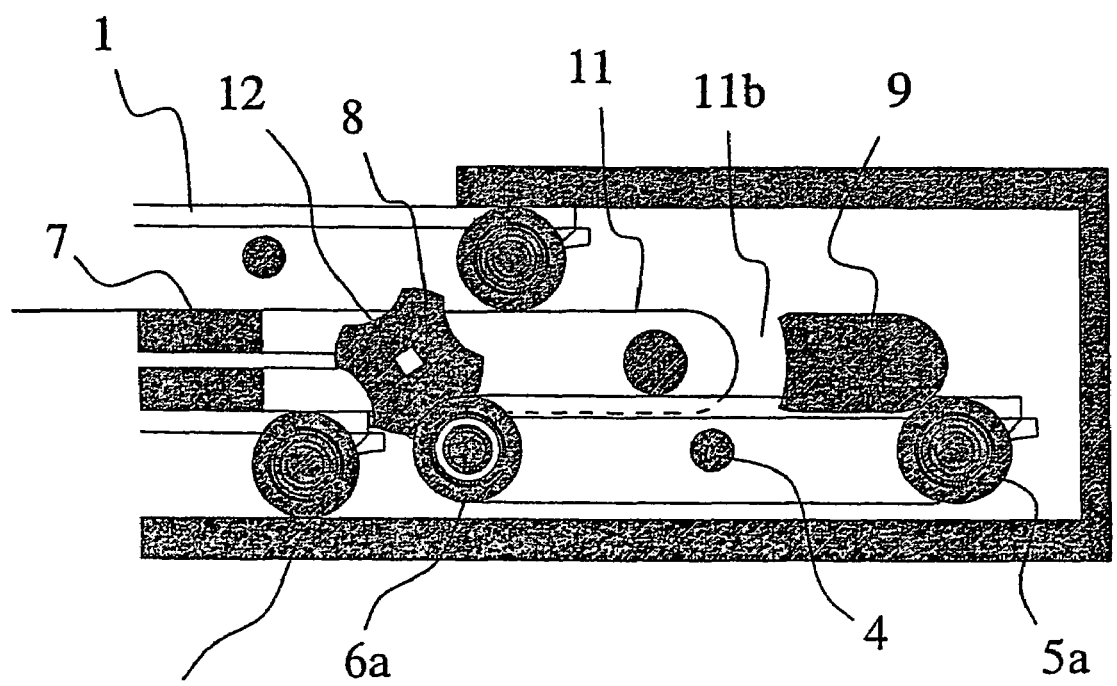
FIG. 3 is a sectional side view of the exit end of the transport conveyor structure of the invention at another stage.

Located at the forward end of each track 7 is an idler 8 that functions as a supporting element supporting the rear end of the pallet 1. The idler 8 forms an extension of the track and is mounted on an axle so as to be freely rotatable. The idler 8 is of an indented wheel design such that the idler 8 has, e.g., four indentations 12 having the shape of a circular arc corresponding to the wheels 5a, 5b and 6a, 6b of the pallet 1. The indentations first receive the front wheels 5a, 5b and then the rear wheels 6a, 6b of the pallet as it passes over the idler 8 at the exit or second end of the transport conveyor. According to one exemplary embodiment, the idler 8 is always in engagement with wheels of at least three pallets 1. The idler 8 moves the rear end of the pallet 1 downwards past a possible "dead center" position when the direction of motion of the pallet is being changed, as shown in FIGS. 2 and 3. The idler 8 can be driven (i.e., rotated) by the front wheel 5*a*, 5*b* of the next pallet 1 in the succession of pallets 1. The placement and structure of the idler 8, the distances between successive indentations 12, as well as the width of the idler can be configured and dimensioned such that both the front wheel 5*a*, 5*b* and the rear wheel 6*a*, 6*b* of the pallet 1 are received in turn in the idler indentations 12. The idler indentations 12 can have a radius of curvature that is at least equal to and preferably somewhat larger than the radius of the wheels 5*a*, 5*b* and 6*a*, 6*b* of the pallet 1. Since the idler 8 is rotated under positive control (e.g., from the front wheels of the next pallet 1 in succession), supports the rear end of the pallet 1 at the exit end of the transport conveyor, and controls movement of the pallet 1 during the change of direction, the position of the pallet 1 is accurately controlled throughout the direction-changing phase. As a result, the risk of the pallet 1 getting jammed at any point during the change of direction is greatly reduced or eliminated.

According to one exemplary embodiment comprising an idler 8, the dimensions are calculated by the following equation:

$$L = \tfrac{1}{2} * (p - \pi/2 * r), \text{ where:}$$

L=distance of the rotational center of the idler 8 from the rotational center of the drive sprocket 3; it is also the distance of the hub of the wheels 5 and 6 from the fastening element 4 of the pallet 1;

p=distance between the fastening elements 4 of successive pallets, preferably as an even number of cogs or chain elements; and r=radius of the sprocket.

Past the track extension 11 (in the direction of motion of the pallet track) there is a passage opening 11*b* having a position and length chosen such that the pallet fastening element 4 can move through the passage opening 11*b* from the upper position to the lower position during the direction change. Similarly, on the other side of the transport conveyor, directly opposite to the track extension 11 and passage opening 11*b*, there is a passage opening 11*c* preferably extending up to the first end of a rest bar 9 located at a distance from the idler 8 at the end of the track. During the change of direction of the pallet, rear wheel 6*b* and the second fastening element 4 can move through passage opening 11*c* from the upper level to the lower level.

The length of the bearing surface of the rest bars 9 can be dimensioned and configured such that the pallet's front wheels 5*a*, 5*b*, supported by the rest bar 9, can move around the rounded front end of the rest bar 9 from the upper position of the pallet to the lower position of the pallet. The drive sprocket 3 (which is only represented as the shaft of the drive sprocket in FIGS. 2, 3, and 4) can be located between the idlers 8 and the rest bars 9 as seen in the direction of motion of the pallets 1.

The endless cogged belt 2 runs around the drive sprocket 3 of the drive machine at each end of the track. The drive sprocket 3 can be driven by the drive machine, which is not shown in the figures. The pallets 1 attached to the cogged belt 2 move together with the cogged belt, forming an endless track for transporting passengers from the entry end of the transport conveyor to the exit end of the transport conveyor.

As stated above, the structure of the apparatus at the entry end of the transport conveyor can be identical to the above-described structure of the exit end of the transport conveyor. At the entry end, the pallet can be guided from its lower position to the upper position by positive control as described above. In this case, the pallet's front wheels 5*a*, 5*b*, which in this direction of motion are the trailing wheels, are supported by the idlers 8, and the front end of each pallet is raised under positive control from the lower level to the transport level, in other words, the pallet is raised in a substantially horizontal plane to the level of track 7. Due to the positive operation, the apparatus works without any jamming problems in both directions of motion.

According to the method of the present invention, the direction of motion of the pallet 1 is changed while keeping the pallet in substantially the same attitude throughout the direction-changing phase. In addition, during the direction change, the trailing end of the pallet 1 is guided by positive control from the level of the current direction of motion to the other level. More specifically, the trailing end of the pallet 1 is guided by the idler 8 from the level of the current direction of motion to the other level. The control of the motion is facilitated by the fact that during direction change the idler 8 is positively rotated by the wheels 5*a*, 5*b* or 6*a*, 6*b* of the pallet immediately following the one whose direction of motion is being changed.

In the above, the same attitude of the pallet 1 means that pallet is never turned upside down, but the pallet is moved from one level to the other in a substantially horizontal position, although a slight inclination in the forward or backward direction relative to the direction of motion is possible.

One of ordinary skill in the art will know that the invention is not limited to the exemplary embodiments described above, but that it may be varied within the scope of the claims presented below. Thus, for example, instead of a cogged belt, the power transmission means used may consist of a suitable different type of belt, chain or, with certain limitations, even rope or the like. In this case, instead of a sprocket, the drive wheel 3 may be, e.g., a chain wheel. For example, a chain is often easier to attach to a pallet and a chain construction is narrower than a cogged belt construction.

Furthermore, the connecting element 4 may have a different structure and may be differently attached to the cogged belt or equivalent. An important point, however, is that the connecting element allows the pallet to remain in substantially the same attitude even if the cogged belt or other power transmission means itself turns upside down.

The structure supporting the front wheels of the pallet (e.g., the track extension 11 at the exit end of the track), may also differ from that described above.

For example, the motion of the rear end of the pallet may be controlled by a suitable guide structure so that the rear end can not rise upwards, thus also preventing the front end from moving downwards.

In addition, one of ordinary skill in the art will know that, instead of being used in a horizontal operating position, the above-described transport conveyor structure can also be used in upwards or downwards inclined positions, for example in auto ramps or the like.

One of ordinary skill in the art will also know that the leading ends of the pallets can also be guided by a curved track. This structure works well especially when the pallet is rising from the lower level to the upper level.

Furthermore, one of ordinary skill in the art will know that, instead of being driven by the pallet coming after the one whose direction of motion is being changed, the idler 8 can be driven in other ways, e.g., by the drive mechanism for the sprocket 3 or a separate drive mechanism. The idlers 8 can be controlled synchronously, e.g., from the drive sprocket 3 so that the pallet 1 remains in a horizontal position while the idler 8 is turning. The transmission between the drive sprocket 3 and the idler 8 can be implemented, e.g., using cogged belt transmission, which can guarantee synchronous mutual motion of the drive sprocket 3 and the idler 8. When synchronous control of the supporting device 8 is used, the wheels 5 and 6 of the pallet need not necessarily be located at the corners of the pallet at a distance from each other that is equal to the radius of turn on the drive sprocket 3.

One of ordinary skill in the art will also know that the idlers 8 can have a shape differing from that described above. Instead of rounded-bottom indentations, the idlers may have V-shaped or similar indentations, in which case the idlers may resemble, e.g., a four-blade impeller with a small hub. Similarly, instead of four indentations, the idler may have three indentations. In this case, the distance of the wheel of the pallet from the rotational center of the idler with three indentations will change during contact.

Furthermore, instead of guiding the pallet by engaging the trailing wheel, the idler 8 may alternatively guide the pallet by engaging some other suitable part, e.g., a special shape on the bottom of the pallet or by a corresponding part.

It will be understood that the above description of the present invention is susceptible to various modifications, changes and adaptations, and the same are intended to be comprehended within the meaning and range of equivalents of the appended claims.

What is claimed is:

1. A method of changing the direction of motion of a pallet at an end of a passenger transport conveyor while maintaining the pallet at a substantially constant attitude, comprising:
   conveying pallets in a passenger transport direction and at a first level;
   conveying pallets in a return direction and at a second, different level;
   positively guiding a trailing end of a first pallet with respect to its direction of motion with a supporting element; and
   rotating the supporting element with a second pallet located immediately behind the first pallet with respect to the direction of motion;
   thereby moving the trailing end of the first pallet from one of the first level and the second level to the other of the first level and the second level and changing the direction of motion of the first pallet, wherein the rotation of the supporting element is effected only by engagement with pallets.

2. The method of claim 1, further comprising the steps of:
   guiding the trailing end of the first pallet with the supporting element from the first level to the second level; or
   guiding the trailing end of the first pallet with the supporting element from the second level to the first level.

3. The method of claim 1, wherein a leading end of the second pallet rotates the supporting element.

4. The method of claim 1, wherein wheels located on the leading end of the second pallet rotate the supporting element.

5. The method of claim 1, wherein the pallets move on wheels.

6. The method of claim 1, wherein each pallet comprises front wheels and rear wheels, at least one of the rear wheels on each respective pallet being located closer to a side edge of the pallet than at least one of the front wheels on the respective pallet, the method further comprising:
   supporting the at least one of the front wheels on a track extension, which track extension provides no support for the at least one of the rear wheels.

7. An apparatus for changing the direction of motion of a pallet at the end of a passenger transport conveyor while maintaining the pallet at a substantially constant attitude, comprising:
   a first track adapted to transport pallets moving on wheels in a passenger transport direction and at a first level;
   a second track adapted to transport pallets moving on wheels in a return direction and at a second, different level;
   a power transmission element adapted to move the pallets along the first and second tracks; and
   a supporting element adapted to positively guide a trailing end of a first pallet with respect to its direction of motion from one of the first level and the second level to the other of the first level and the second level, the supporting element adapted to be rotated only by pallets including a second pallet located immediately behind the first pallet with respect to the direction of motion.

8. The apparatus of claim 7, wherein the supporting element comprises an idler wheel rotatably mounted on an axle and having a plurality of indentations corresponding to the wheels of the pallets.

9. The apparatus of claim 7, wherein the supporting element is located at an end of the tracks.

10. The apparatus of claim 9, wherein the supporting element is adapted and configured to be positively rotated by wheels located on a leading edge of the second pallet.

11. The apparatus method of claim 7, wherein the power transmission element comprises a cogged belt or a chain.

12. The apparatus of claim 7, wherein each pallet comprises front wheels and rear wheels, at least one of the rear wheels on each respective pallet being located closer to a side edge of the pallet than at least one of the front wheels on the respective pallet, the apparatus further comprising:
   a track extension extending adapted to support the at least one of the front wheels, which track extension provides no support for the at least one of the rear wheels.

* * * * *